US011251646B2

(12) United States Patent
Chen et al.

(10) Patent No.: US 11,251,646 B2
(45) Date of Patent: Feb. 15, 2022

(54) VEHICLE AUXILIARY POWER SUPPLY SYSTEM

(71) Applicant: Ford Global Technologies, LLC, Dearborn, MI (US)

(72) Inventors: Hanyang B. Chen, Canton, MI (US); Michael Irby, Monroe, MI (US); Jason Baker, Westland, MI (US); Gabriel Jim, Canton, MI (US); Anthony Thomas Spoto, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 5 days.

(21) Appl. No.: 16/591,762

(22) Filed: Oct. 3, 2019

(65) Prior Publication Data

US 2021/0104905 A1 Apr. 8, 2021

(51) Int. Cl.

| | |
|---|---|
| ***H02J 7/04*** | (2006.01) |
| ***H02J 9/06*** | (2006.01) |
| ***B60L 1/02*** | (2006.01) |
| ***B60L 1/00*** | (2006.01) |
| ***H02J 7/00*** | (2006.01) |

(52) U.S. Cl.

CPC .............. *H02J 7/045* (2013.01); *B60L 1/003* (2013.01); *B60L 1/02* (2013.01); *H02J 7/0024* (2013.01); *H02J 9/061* (2013.01)

(58) Field of Classification Search

CPC .......... H02J 7/045; H02J 7/0024; H02J 9/061; B60L 1/003; B60L 1/02

USPC .......................................................... 307/101

See application file for complete search history.

(56) References Cited

U.S. PATENT DOCUMENTS

| | | | |
|---|---|---|---|
| 7,667,438 B2 | 2/2010 | Ashtiani et al. | |
| 8,190,350 B2 | 5/2012 | Kortschak et al. | |
| 10,124,793 B2 | 11/2018 | Ciaccio et al. | |
| 10,804,815 B1 * | 10/2020 | Chen | H02J 7/1423 |
| 2020/0309080 A1 * | 10/2020 | Chen | F02N 11/0825 |
| 2021/0016729 A1 * | 1/2021 | Salter | B60R 16/033 |

FOREIGN PATENT DOCUMENTS

CN 104074661 A 10/2014

OTHER PUBLICATIONS

"Peach Parts Mercedes-Benz Forum" Mercedes-Benz Tech Information, Mar. 30, 2017, 10 pages www.peachparts.com/shoforum/diesel-discussion/38503-i-replaced-lead-acid-battery-ultracapacitors.html.

* cited by examiner

*Primary Examiner* — Hal Kaplan
(74) *Attorney, Agent, or Firm* — Frank Lollo; Price Heneveld LLP

(57) ABSTRACT

A power system for a vehicle comprises a first power supply network configured to operate at a first voltage. The first power supply network comprises a first alternator, a starter motor, and a battery conductively connected to the first alternator and the starter motor. The system further comprises a second power supply network configured to operate at a second voltage. The second power supply network comprises a second alternator, a power supply receptacle configured to output power to an external accessory, and a capacitive energy storage device conductively connected to the second alternator and the power supply receptacle. A directional conduction device interconnects the first power supply network and the second power supply network.

19 Claims, 5 Drawing Sheets

VEHICLE AUXILIARY POWER SUPPLY SYSTEM

FIELD OF THE DISCLOSURE

The present disclosure generally relates to a power supply system for a vehicle and more particularly relates to a vehicle power supply system configured to generate power for the operation of auxiliary devices.

BACKGROUND OF THE DISCLOSURE

The use of high power electronic accessories in mobile applications may commonly result in significant increases in weight due to the utilization of large batteries (e.g. lead-acid batteries) required to sustain operation for extended periods. The disclosure provides for a system configured to limit the weight of a mobile electrical power supply for a vehicle while providing extended operation and maintaining performance for high power applications.

SUMMARY OF THE DISCLOSURE

According to one aspect of the present disclosure, a power system for a vehicle is disclosed. The system comprises a first power supply network configured to operate at a first voltage. The first power supply network comprises a first alternator, a starter motor, and a battery conductively connected to the first alternator and the starter motor. The system further comprises a second power supply network configured to operate at a second voltage. The second power supply network comprises a second alternator, a power supply receptacle configured to output power to an external accessory, and a capacitive energy storage device conductively connected to the second alternator and the power supply receptacle. A directional conduction device interconnects the first power supply network and the second power supply network.

Various aspects of the disclosure can include any one or a combination of the following features or configurations:

- an electrical sensor configured to detect a charge of the capacitive energy storage device, wherein the electrical sensor comprises a current sensor, a voltage sensor, etc.;
- a voltage sensor configured to monitor voltage of a power network to which the capacitive energy storage device is connected;
- a control module, wherein the control module is configured to monitor the charge of the capacitor determining a stored voltage and selectively activate the second alternator in response to a change in the stored voltage;
- the second voltage is greater than the first voltage;
- the capacitive energy storage device comprises an ultra-capacitor configured to operate at the second voltage;
- the directional conduction device is configured to conduct current from the first power supply network to the second power supply network and restrict current from being conducted from the second power supply network to the first power supply network;
- the directional conduction device comprises a diode comprising an anode in connection with the first power supply network and a cathode in connection with the second power supply network;
- the energy storage device is conductively connected on an anode side to the second power network and on a cathode side to a ground;

- the energy storage device comprises a storage potential greater than or equal to the second voltage;
- the energy storage device is conductively connected on an anode side to the second power network and on a cathode side to the first power network;
- the energy storage device comprises a storage potential less than the second voltage;
- the energy storage device comprises a storage potential greater than the first voltage;
- the first power supply network is configured to supply power to a vehicle load, wherein the vehicle load comprises a plurality of electronic devices utilized to control the operation of the vehicle;
- the second power supply network further comprises a power inverter configured to convert the second voltage from direct current (DC) power to alternating current (AC) power; and/or
- the second power supply network is configured supply power to at least one external accessory configured to operate via the AC power.

According to another aspect of the present disclosure, a method for supplying power for an external accessory in connection with a vehicle is disclosed. The method comprises generating a first energy at a first voltage in a first electrical circuit via the mechanical motion of an engine of the vehicle and storing the first energy as chemical energy in a battery. The method further comprises supplying the first energy to an alternator to start the engine of the vehicle and generating a second energy at a second voltage in a second electrical circuit via the mechanical motion derived of the engine. The method further comprises storing the second energy in a capacitive storage device and supplying the second energy to an external accessory conductively connected to the vehicle. The first energy from the first electrical circuit is directionally conducted to the second electrical circuit in order to charge the capacitive storage device.

Various aspects of the disclosure can include any one or a combination of the following features or configurations:

- conducting the first energy to a vehicle load comprising the alternator via the first circuit, wherein the vehicle load comprises a plurality of electronic devices utilized to control the operation of the vehicle; and/or
- converting the second energy from direct current to alternating current and supplying the alternating current to the external electrical accessory.

According to another aspect of the present disclosure, a power system for a vehicle is disclosed. The system comprises a first power supply network configured to operate at a first voltage. The first power supply network comprises a first alternator, a starter motor, and a battery conductively connected to the first alternator and the starter motor. The system further comprises a second power supply network configured to operate at a second voltage. The second voltage is greater than the first voltage. The second power supply network comprises a second alternator, a power supply receptacle configured to output power to an external accessory, and a capacitive energy storage device conductively connected to the second alternator and the power supply receptacle. A directional conduction device interconnects the first power supply network and the second power supply network. The directional conduction device is configured to conduct current from the first power supply network to the second power supply network and restrict current from being conducted from the second power supply network to the first power supply network.

Various aspects of the disclosure can include any one or a combination of the following features or configurations:

a current sensor configured to detect a charge of the capacitive energy storage device; and/or a control module, wherein the control module is configured to monitor the charge of the capacitor determining a stored voltage and selectively activate the second alternator in response to a change in the stored voltage.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
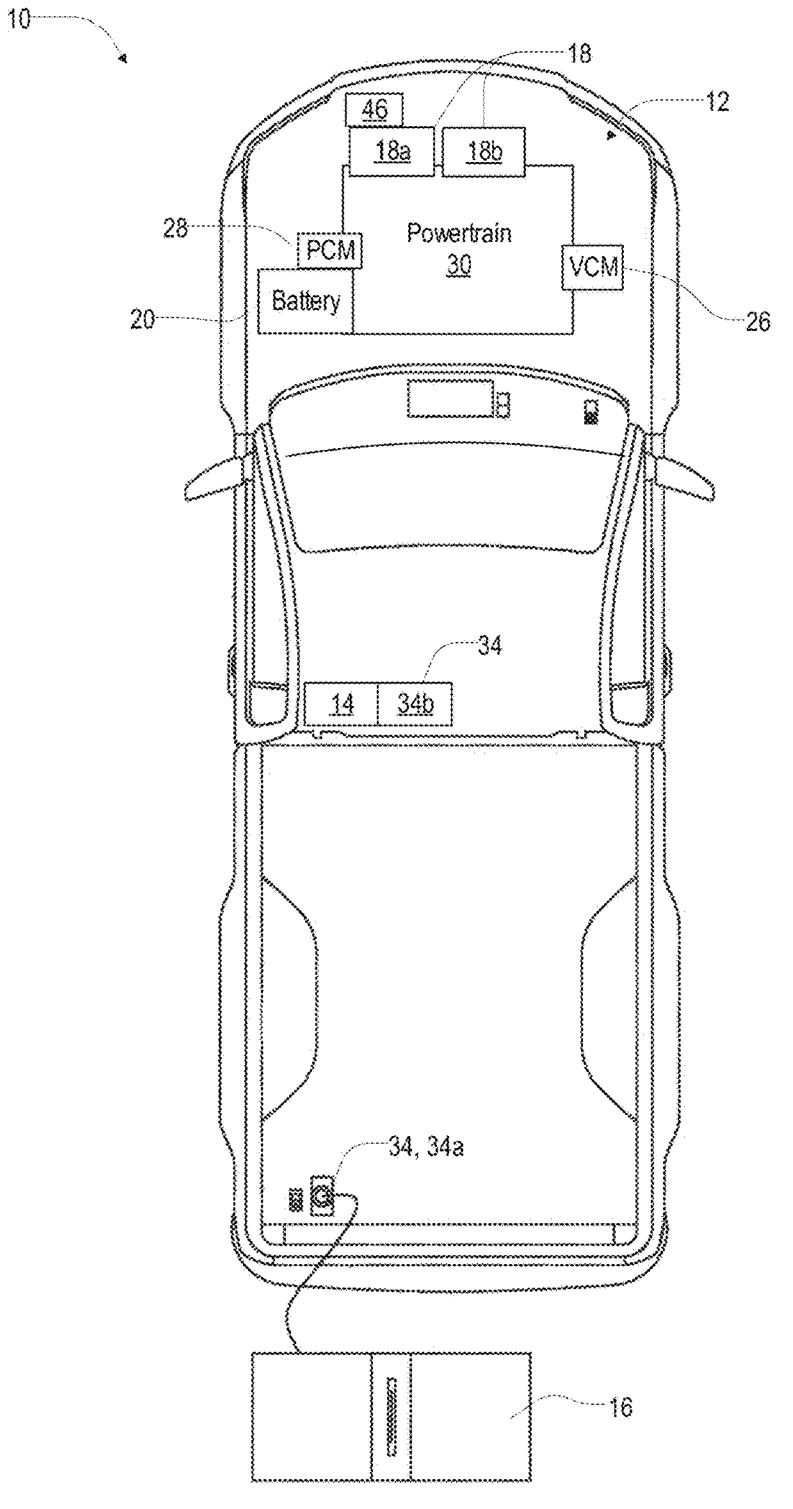
FIG. 1 is a top plan view of a vehicle comprising a mobile power supply system.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction, or the like, does not mean that the feature or component follows a straight line or axis in such a direction or that it only extends in such direction or on such a plane without other directional components or deviations, unless otherwise specified.

Referring to FIG. 1, a vehicle 10 is shown comprising a power system 12. The power system 12 may comprise a power inverter 14, which may be configured to output power with alternating current (AC). The AC power may be accessible from the vehicle 10 to power a variety of electronic accessories 16 so that they may be operated via the power system 12. In some implementations, the power system 12 may be supplied electrical energy via an auxiliary or second alternator **18*b*, which may be implemented in combination with a primary or first alternator 18*a*. In general, the first alternator 18*a* the second alternator 18*b* are denoted as at least one alternator 18. In operation, the first or primary alternator 18*a* may be configured to charge a battery 20 and supply power to a first power network 22*a*, and the second or auxiliary alternator 18*b* may be configured to supply power to a second power network 22*b* (power networks 22 shown in FIGS. 2-4). The first power network 22*a* may be configured to operate at a first voltage (e.g. 12 volts), while the second power network 22*b* may be configured to operate at a second voltage (e.g. 24 volts). In an exemplary embodiment, the second voltage of the second network may operate at a higher electrical potential or higher voltage than the first voltage. Additionally, in an exemplary implementation, the first network 22*a* and the second network 22*b* may be interconnected via a directional conduction device. Accordingly, the first and second power networks 22*a* and 22*b*, respectively, of the vehicle 10 may operate in combination to support the power needs of the vehicle 10 in various capacities. Detailed examples of the relationship between the first power network 22*a* and the second power network 22*b* are demonstrated in FIGS. 3 and 4**.

In some aspects, the first power network **22*a* may be utilized to supply power for the operation of the vehicle 10 and various electronic vehicle components 24. For example, the primary alternator 18*a* may be configured to supply or sustain power for vehicle ignition, operation, and additionally to power various vehicle components (e.g. instrument panel, audio/video entertainment devices, infotainment devices, navigation systems, accessory ports, communication ports, etc.). The vehicle components 24 may further comprise one or more vehicle control systems such as a vehicle control module (VCM) 26 and a power control module (PCM) 28. Accordingly, the first power network 22*a* may be supplied operating electrical energy via the first alternator 18*a* based on mechanical energy generated by a powertrain 30 of the vehicle 10. The energy supplied by the first network 22*a* may then be utilized to operate various systems incorporated in the vehicle 10. As discussed herein, the powertrain 30 may be configured to generate the mechanical energy that is converted by the first alternator 18*a* to supply the power to the vehicle load 48 and/or the electrically powered accessories 16 via the power inverter 14. The powertrain 30 may comprise an engine, transmission, drive shafts, and/or configured to provide for the motion of the vehicle 10**.

The vehicle control module 26 may correspond to a powertrain control module and/or a body control module of the vehicle 10. Accordingly, the vehicle control module 26 may be configured to control various subsystems of the vehicle 10. For example, the vehicle control module 26 may control power windows, power locks, a security system, power mirrors, etc. Accordingly, the vehicle control module 26 may be electrically coupled to the first power network **22*a* to, for example, drive relays (e.g., to control wiper fluid, etc.), drive brushed direct current (DC) motors (e.g., to control power seats, power locks, power windows, wipers, etc.), drive stepper motors, and/or drive LEDs, etc. In some implementations, the vehicle control module 26 may also be configured to control an ignition system, which may be configured to control an ignition of the vehicle 10 in a start-stop operation. As discussed herein, the start-stop operation may refer to an efficiency measure applied by the vehicle that stops combustion of an engine of the powertrain 30 of the vehicle 10 when an idle condition is detected by the vehicle control module 26**.

The second power network **22*b* may be configured to supply power to one or more external devices or electrically powered accessories 16. As demonstrated in FIG. 1, the accessories 16 may correspond to various electronic or electrical devices. In the example shown in FIG. 1, the accessory 16 is a power tool (e.g. a saw, compressor, etc.) shown in connection with an exterior electrical outlet 34***a* disposed in a bed or cargo compartment 36 of the vehicle 10. However, the vehicle 10 may comprise various electrical outlets 34 or receptacles such as an interior outlet 34*b* and/or additional outlets incorporated on exterior panels or various portions of the vehicle 10. The second power network 22*b* may supply power to the one or more outlets 34 via a power inverter 14 in communication with the second or auxiliary alternator 18*b*. In this configuration, the vehicle 10 may be capable of supplying power to a variety of electrical accessories 16 or appliances such that the accessories 16 may be utilized in any location accessible to the vehicle 10.

Figure 2:
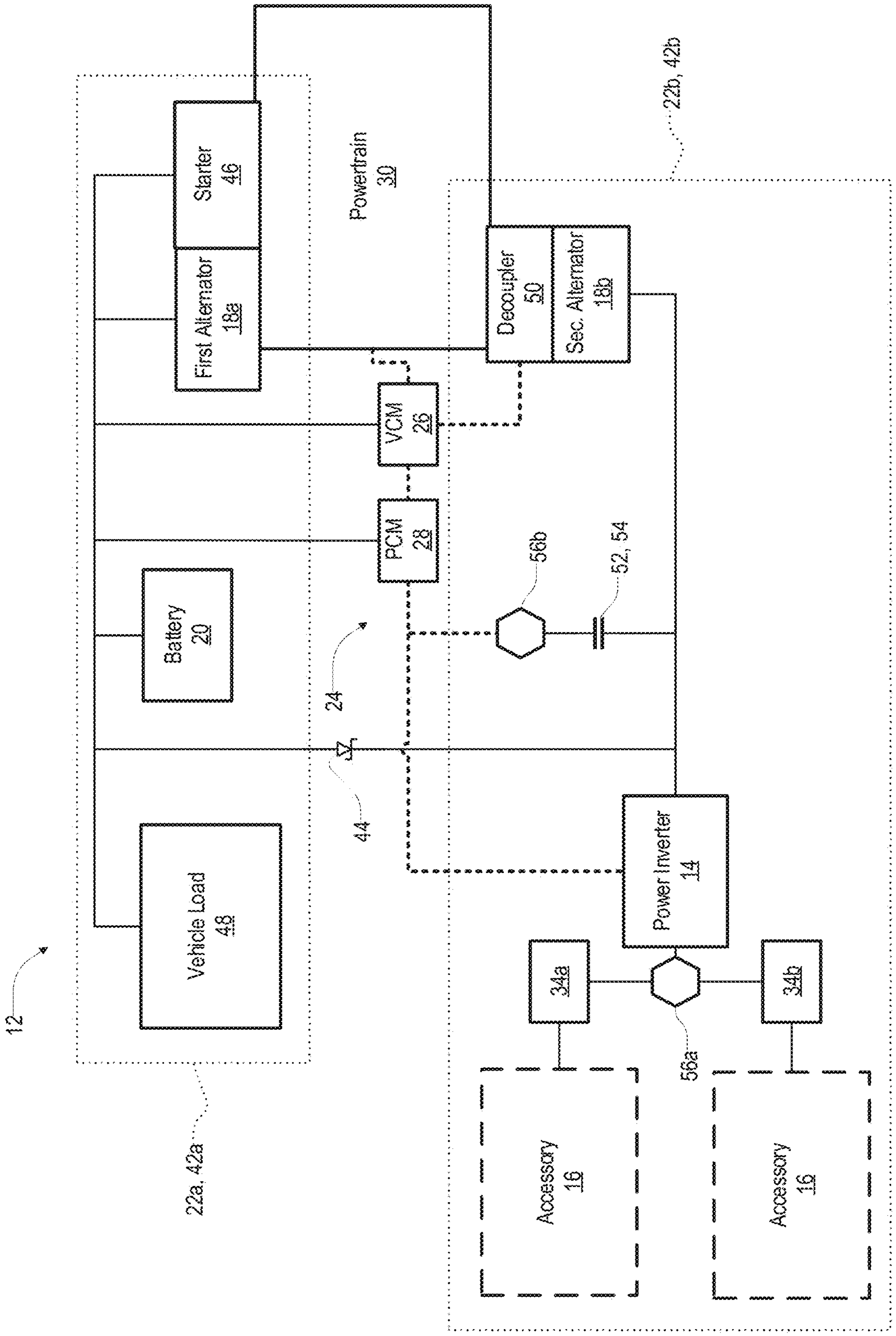
FIG. 2 is a block diagram of a power supply system comprising interconnected power networks.

FIG. 2 demonstrates a block diagram demonstrating the power system 12 comprising the first power network 22*a* and the second power network 22*b*. Referring now to FIGS. 1 and 2, as the first power network 22*a* may correspond to a first electrical circuit 42*a* and the second power network 22*b* may correspond to a second electrical circuit 42*b*. As illustrated in FIG. 2, the first electrical circuit 42*a* may be interconnected with second electrical circuit 42*b* via a directional conduction device 44. Accordingly, the first and second power networks 22*a* and 22*b*, respectively, of the vehicle 10 may operate in combination to support the power needs of the vehicle 10 in various capacities. In the exemplary embodiment shown, the second power network 22*b* may be in connection with the first power network 22*a* via the directional conduction device 44, which may be in the form of an asymmetric conduction device or rectifier. In various implementations, the directional conduction device 44 may be implemented as a diode, Schottky diode, semiconductor diode, bipolar transistor isolator, directional switch, or various components or circuits that may control a direction of power exchanged between the first power network 22*a* and the second power network 22*b*.

The exchange of power between the first power network 22*a* and the second power network 22*b* may provide for current to be delivered to the second alternator 18*b* in order to initiate activation. For example, most alternators that may be implemented in the vehicle 10 are designed with a rotor coil and require an initial field current for activation. One primary usage of the directional conduction device 44 (e.g. diode) may be supplying the initial field current from the first power network 22*a* to a rotor coil of the second alternator 18*b* in order to initiate the activation of the second alternator 18*b*. Once activated, the second alternator 18*b* may be operable to generate power to support the current draw of the rotor field current by itself without any outside power required. Accordingly, the current supplied from the first power network 22*a* via the directional conduction device 44 may allow the second alternator 18*b* to be operated without a second or dedicated electro-chemical battery cell. Accordingly, as further discussed herein, the connection of the first power network 22*a* to the second power network 22*b* may provide for improved operation of the power system 12, such that the operation of high power accessories may be supported for extended periods depleting an auxiliary battery or resulting in diminished operation over time.

Referring now to FIG. 2, the power system 12 of the vehicle 10 may utilize the mechanical motion of the powertrain 30 to generate power with each of the alternators 18*a*, 18*b*. The first or primary alternator 18*a* may be configured to supply operating energy to the electronic vehicle components 24 at a first voltage (e.g. 12V). For example, the primary alternator 18*a* may be configured to supply or sustain power for vehicle ignition, operation, and additionally to power various vehicle accessories (e.g. instrument panel, audio/video entertainment devices, infotainment devices, navigation systems, accessory ports, communication ports, etc.). The vehicle components 24 the vehicle control module (VCM) 26 and the power control module (PCM) 28 as discussed later in further detail. Accordingly, the first alternator 18*a* may be conductively coupled to the battery 20, a starter 46 of an engine of the powertrain 30, and a vehicle load 48 representing the energy utilized by the various vehicle components 24.

The second or auxiliary alternator 18*b* may also be configured to generate electrical energy at a second voltage (e.g. 24V) based derived from the mechanical motion of the powertrain 30. The second voltage may be different from or greater than the first voltage generated by the first alternator 18*a*. The second alternator 18*b* may be in connection with the powertrain 30 via a pulley or coupling apparatus. In this configuration, the second alternator 18*b* may be activated by the vehicle control module 26 and/or the power control module 28. Such an activation of the second alternator 18*b* may be controlled based on a power request or current draw from the outlets, which may be identified by the power control module 28. The second power network 22*b* may supply power to the one or more outlets 34 via the power inverter 14 in communication with the second or auxiliary alternator 18*b*. In this configuration, the second power network 22*b* power to a variety of electrical accessories 16 or appliances such that the accessories 16 may be utilized in any location accessible to the vehicle 10.

Though the examples provided in this disclosure refer to electrical potentials or voltages of 12V and 24V with respect to the first and second power networks 22*a* and 22*b*, the teachings of the disclosure may be applicable to various operating voltages. For example, the electrical potential of the system 12 may correspond to a first voltage and a second voltage for each of the electrical circuits 42*a* and 42*b* that may vary from 0-240 volts or higher voltage, which may depend on the type of vehicle and application of the system 12. In some examples, the voltages may correspond to various circuits configured to operate at a variety of corresponding voltages or electrical potentials including but not limited to 5V, 12V, 24V, 48V, etc. Though the exemplary values discussed in detail herein may correspond to a common 12V power supply utilized in conventional passenger vehicles, the disclosure may be applied to and scaled for applications that may require much higher power output (industrial, construction, etc.) or smaller applications (e.g. scale or special-purpose devices) that may not require the energy consumption of the accessories 16 discussed herein. Accordingly, the specific voltage values are provided as examples, and it shall be understood that the systems and methods provided herein may be implemented to suit a variety of voltages and load conditions without departing from the spirit of the disclosure.

The power inverter 14 may be configured to convert the direct current (DC) generated by the second alternator 18*b* into AC power. In an exemplary implementation, the power inverter 14 may be configured to output AC power at approximately 2 kW. However, many electrical accessories 16 (e.g. power tools, mechanical lifts, pumps, compressors, plow attachments, etc.) may draw high surge loads, particularly during startup. Accordingly, an accessory 16 configured to have an operational power consumption of 2 kW may have a surge load of 4 kW. In order to provide such operating energy to the accessories 16, the second power networks 22*b* may comprise an energy storage device 52 configured to resist changes in the voltage generated by the second alternator 18*b* that may otherwise result from the surge load of the accessories 16 exceeding the power supplied by the power inverter 14 based on the voltage generated by the second alternator 18*b* alone.

In some instances, the storage device 52 may be implemented as at least one capacitor 54 or ultracapacitors. For example, the at least one capacitor may be implemented as a plurality of capacitors configured to provide an increased voltage in series and/or increased capacitance in a parallel configuration. In some examples, the storage device 52 may comprise a 32V ultracapacitor constructed from two individual capacitors having a storage potential of 16V and a capacitance of 58F connected in series. By utilizing the capacitors instead of conventional batteries, the system 12 may provide for improved longevity due to the lack of battery replacement. Additionally, the utilization of the at least one capacitor 54 as the storage device 52 may provide for significant decreases in weight when compared to the weight of a conventional lead-acid other electro-chemical battery cells. In the example of an ultracapacitor being implemented as the storage device 52, the ultracapacitor may provide a higher specific power density, cycle life, and charge/discharge efficiency than a lead-acid battery. Additionally, the at least one capacitor 54 or ultracapacitor may provide for significant improvements in performance over a range of operating temperatures when compared to a lead-acid battery.

The utilization of the at least one capacitor 54 without the support of an electrochemical energy storage device (e.g. a conventional battery) may, however, result in periods of operation when the capacitor does not have sufficient energy to support the operation of the second alternator 18*b*. For example, if the capacitor 54 is discharged or prior to a charge, the capacitor 54 may not have sufficient charge to provide the energy for a field charge required to activate the second alternator 18*b*. In contrast, the battery 20 of the first power network 22*a* may provide the field charge to the first alternator 18*a* in such circumstances. Accordingly, in order to ensure the power necessary to maintain the operation of the second alternator 18*b* and the second power network, the directional conduction device 44 may be interconnected the first electrical circuit 42*a* with the second electrical circuit 42*b*. In this configuration, the energy required to provide the field charge to activate the second alternator 18*b* may be supplied from the first power network 22*a* via the directional conduction device 44.

In operation, the power control module 28 may be supplied operating power from the first power network 22*a* and may be configured to monitor a first electrical sensor 56*a* of the power inverter 14 to identify a power request from the second power network 22*b*. Additionally, the power control module 28 may be configured to detect the charge of the energy storage device 52 via a second electrical sensor 56*b*. As discussed herein, each of the first electrical sensor 56*a* and the second electrical sensor 56*b* may be implemented by a Hall Effect current sensor, a voltage shunt (e.g. shunt resistor), or other electrical monitoring and detection devices. Accordingly, the power control module 28 may be configured to identify if a power output request from the inverter 14. Additionally, the power control module 28 may be configured to monitor the voltage of the storage device 52 relative to a predetermined voltage threshold (e.g. a minimum field charge or surge voltage threshold). In response to the detection of the power output request or the voltage of the storage device 52 less than the predetermined voltage threshold, the power control module 28 may be configured to communicate a request the vehicle control module 26 to activate the second alternator 18*b*.

Still referring to FIG. 2, the vehicle control module 26 may be configured to control a variety of vehicle components and systems. The vehicle control module 26 may be configured to control various system and accessories, including but not limited to power windows, power locks, a security system, power mirrors, etc. The vehicle control module 26 may further be configured to control the throttle, powertrain 30, gear selection, parking brake activation and various electro-mechanical systems of the vehicle 10. For example, the vehicle control module 26 may be configured to control the ignition, fuel injection, and emission systems of the vehicle 10. The vehicle control module 26 may also monitor the power control module 28 as well as various sensors (e.g., wheel speed sensors, emission sensors, etc.) and apply control algorithms to control the various systems discussed herein.

In various implementations, the vehicle control module 26 may be implemented as one or more processors in communication with a memory. Similarly, the power control module 28 may comprise various circuits and/or processors configured to perform the various detection and communication processes provided by the disclosure in combination with the vehicle control module 26. The one or more processors discussed herein may be any suitable processing device or set of processing devices such as, but not limited to: a microprocessor, a microcontroller-based platform, a suitable integrated circuit, one or more field-programmable gate arrays (FPGAs), and/or one or more application-specific integrated circuits (ASICs). The memory may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid-state drives, etc.). In some examples, the memory includes multiple kinds of memory, particularly volatile memory and non-volatile memory.

The memory referred to in the disclosure may correspond to a computer-readable media on which one or more sets of instructions, such as the software for operating the methods of the present disclosure, can be embedded. The instructions may embody one or more of the methods or logic as described herein. Additionally, the terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein.

Figure 3:
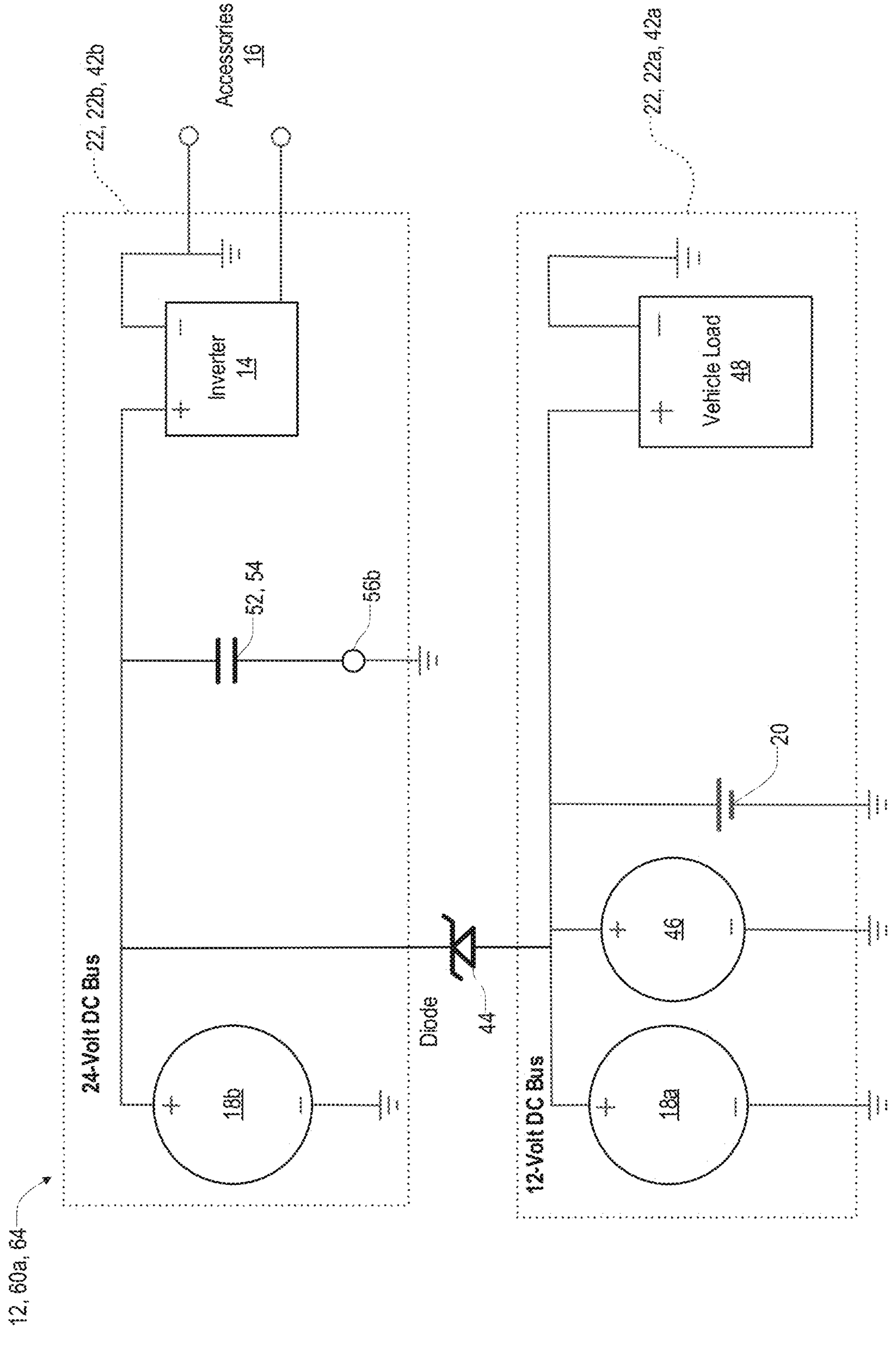
FIG. 3 is a schematic diagram of an exemplary topography of a power supply system comprising interconnected power networks.
Figure 4:
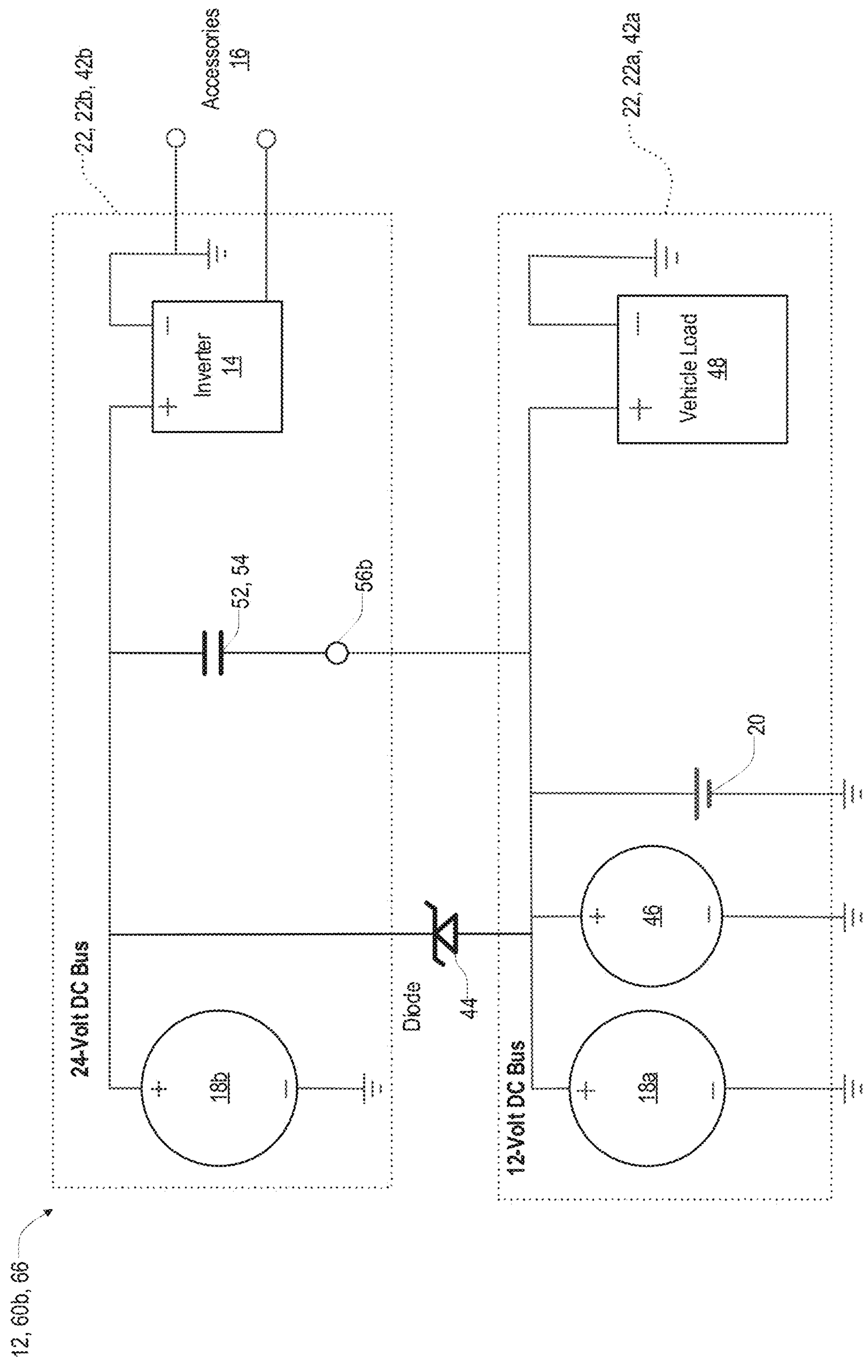
FIG. 4 is a schematic diagram of an exemplary topography of a power supply system comprising interconnected power networks.

FIGS. 3 and 4 are block diagrams illustrating two exemplary topographies 60*a*, 60*b* of the power system 12. For clarity, the similar aspects of a first topography 60*a* shown in FIG. 3 and a second topography 60*b* are first discussed in reference to FIGS. 3 and 4, and the differences are later discussed individually. Referring now to FIGS. 3 and 4 in various implementations, the system 12 may comprise the first power network 22*a* and the second power network 22*b*. The first electrical circuit 42*a* of the first network, 22*a* may be interconnected with second electrical circuit 42*b* of the second network 22*b* via a directional conduction device 44. Accordingly, the first and second power networks 22*a* and 22*b*, respectively, of the vehicle 10 may operate in combination to support the power needs of the vehicle 10 in various capacities.

The second power network 22*b* may be in connection with the first power network 22*a* via the directional conduction device 44. The directional conduction device 44 may be in the form of an asymmetric conduction device or rectifier. In various implementations, the directional conduction device 44 may be implemented as a diode, Schottky diode, semiconductor diode, bipolar transistor isolator, directional switch, or various components or circuits that may control a direction of power exchanged between the first power network and the second power network. As further discussed herein, the connection of the first power network 22*a* to the second power network 22*b* may provide for improved operation of the power system 12 such that the operation of high power accessories may be supported for extended periods without depleting an auxiliary battery or resulting in diminished operation over time.

The first or primary alternator 18*a* may be configured to supply operating energy to the electronic vehicle components 24 at a first voltage (e.g. 12V). The first alternator 18*a* may be conductively coupled to the battery 20, a starter 46 of an engine of the powertrain 30, and a vehicle load 48 representing the energy utilized by the various vehicle components 24. The power needs for the operation of the vehicle components 24 in combination may be referred to as the vehicle load 48. The vehicle load 48 may comprise power required for vehicle ignition, operation, and additionally to power various vehicle accessories (e.g. instrument panel, audio/video entertainment devices, infotainment devices, navigation systems, accessory ports, communication ports, etc.). The vehicle components 24, the vehicle control module (VCM) 26, and the power control module (PCM) 28 are discussed later in further detail.

The second or auxiliary alternator 18*b* may also be configured to generate electrical energy at a second voltage (e.g. 24V) based derived from the mechanical motion of the powertrain 30. The second voltage may be different from or greater than the first voltage generated by the first alternator 18*a*. The second alternator 18*b* may be configured to be selectively engaged via a clutch pulley or decoupler 50 in connection with the powertrain 30. In this configuration, the second alternator 18*b* be may be selectively activated by the vehicle control module 26 and/or the power control module 28. The second power network 22*b* may supply power to the one or more outlets 34 via the power inverter 14 in communication with the second or auxiliary alternator 18*b*. In this configuration, the second power network 22*b* power to a variety of electrical accessories 16 or appliances such that the accessories 16 may be utilized in any location accessible to the vehicle 10.

The power inverter 14 may be configured to convert the direct current (DC) generated by the second alternator 18*b* into AC power. In an exemplary implementation, the power inverter 14 may be configured to output AC power at approximately 2 kW. However, many electrical accessories 16 (e.g. power tools, mechanical lifts, and plow attachments) may draw high surge loads, particularly during startup. Accordingly, an accessory 16 configured to have an operational power consumption of 2 kW may have a surge load of 4 kW. In order to provide such operating energy to such accessories, the second power networks 22*b* may comprise an energy storage device 52. The storage device 52 may be implemented as at least one capacitor 54 or ultracapacitors. By utilizing the capacitors instead of conventional batteries, the system 12 may provide for improved longevity by not requiring battery replacement. Additionally, the utilization of the at least one capacitor 54 as storage device 52 may provide for significant decreases in weight when compared to the weight of a conventional lead-acid battery cell.

Referring now to FIG. 3, the first topography 60*a* of the system 12 may comprise a first configuration 64 of the energy storage device 52. In the first topography 60*a*, the energy storage device may be implemented by the at least one capacitor 54 having a voltage potential exceeding the average operating voltage generated by the second alternator 18*b* of the second power network 22*b*. For example, as previously discussed, the energy storage device 52 may be implemented as a plurality of capacitors 54 configured to provide an increased voltage in series. As shown in FIG. 3, the energy storage device 52 is connected on a first side (e.g. an anode side) to the second circuit 42*b* and on a second side (e.g. a cathode side) to ground. Accordingly, in the first topography 60*a*, the energy storage device 52 is in connection with the first circuit 42*a* only via the directional conduction device 44. In the instant example, the first voltage of the first circuit 42*a* is 12V and the second voltage of the second circuit 42*b* is 24V. The storage device 52 comprises an ultracapacitor having a storage potential of 32V constructed from two individual capacitors, each having a storage capacity or potential of 16V and a capacitance of 58F connected in series. Accordingly, in the example provided by the first topography 60*a*, the first voltage is greater than or equal to the second voltage, and the voltage potential of the ultracapacitor exceeds the first voltage and the second voltage.

Referring now to FIG. 4, the second topography 60*b* of the system 12 may comprise a second configuration 66 of the energy storage device 52. In the second topography 60*b*, the energy storage device may be implemented by the at least one capacitor 54 having a voltage potential that may be less than the second voltage of the second circuit 42*b*. The voltage potential of the at least one capacitor 54 may also be less than the average operating voltage generated by the second alternator 18*b* of the second power network 22*b*. For example, as previously discussed, energy storage device 52 may be implemented in various configurations. As shown in FIG. 4, the energy storage device 52 is connected on a first side (e.g. an anode side) to the second circuit 42*b* and on a second side (e.g. a cathode side) to the first circuit 42*a*. Accordingly, in the second topography 60*b*, the second circuit 42*b* is in connection with the first circuit 42*a* via the directional conduction device 44 and the energy storage device 52. In this configuration, power may be drawn through the energy storage device 52 such that the first power generated and stored in the first power network 22*a* may be supplied to the inverter 14 during surge operations of the accessories 16. In the instant example, the first voltage of the first circuit 42*a* is 12V, and the second voltage of the second circuit 42*b* is 24V. The storage device 52 comprises a single ultracapacitor having a storage potential of 16V and a capacitance of 58F.

Though the examples provided in this disclosure refer to electrical potentials or voltages of 12V and 24V with respect to the first and second power networks 22*a* and 22*b*, the teachings of the disclosure may be applicable to various operating voltages. For example, the electrical potential of the system 12 may correspond to a first voltage and a second voltage for each of the electrical circuits 42*a* and 42*b* that may vary from 0-240 volts depending on the type of vehicle and application of the system 12. In some examples, the voltages may correspond to various circuits configured to operate at a variety of corresponding electrical potentials including but not limited to 5V, 12V, 24V, 48V, etc. Accordingly, the specific voltage values are provided as examples, and it shall be understood that the systems and methods provided herein may be implemented to suit a variety of voltages and load conditions without departing from the spirit of the disclosure.

Figure 5:
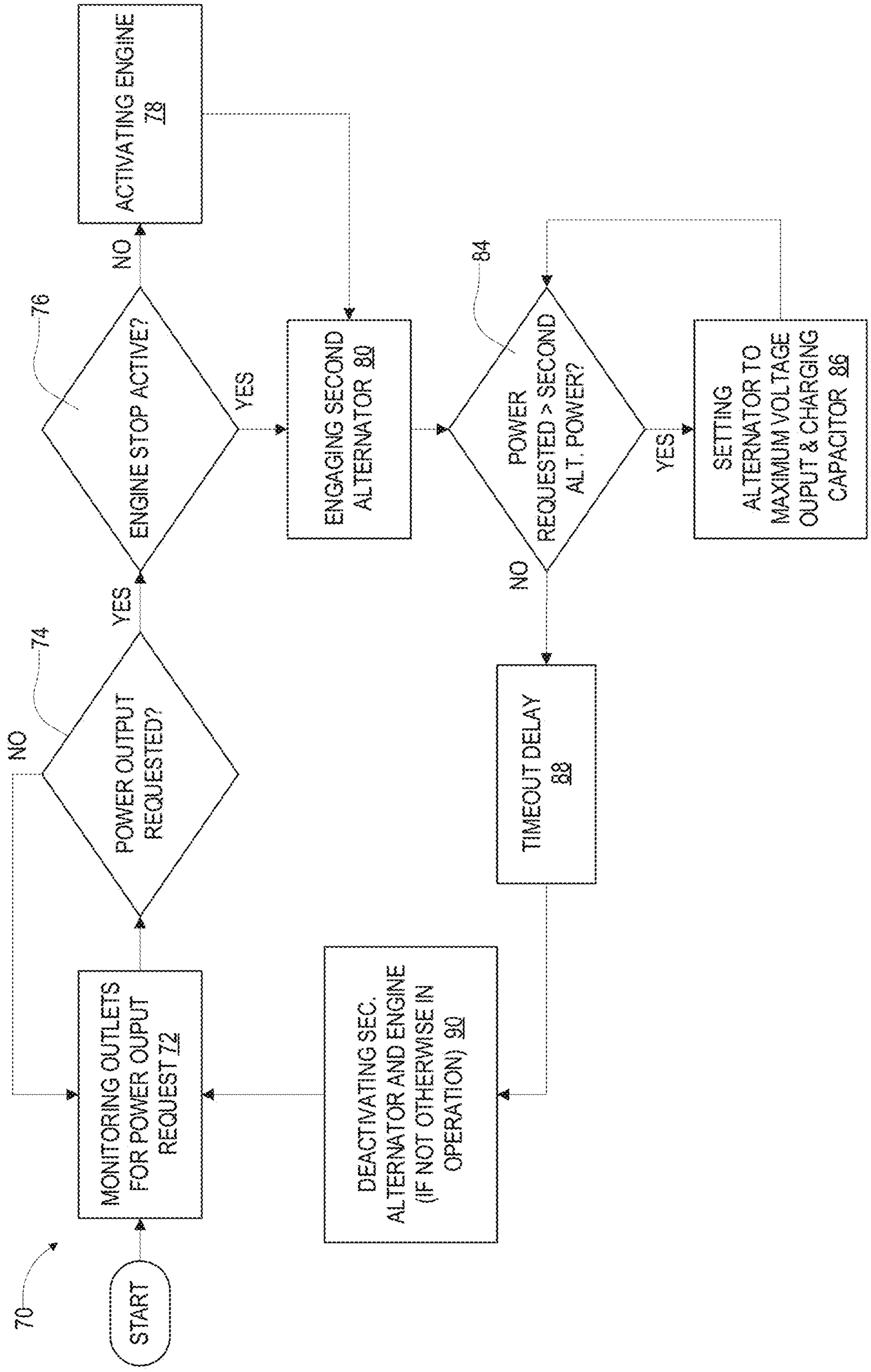
FIG. 5 is a flow chart demonstrating a method of controlling a power supply system comprising interconnected power networks in accordance with the disclosure.

Referring now to FIG. 5, a flow chart of a method 70 of operation of the system 12 is shown. As discussed herein, the various methods and processes described herein may be accomplished via the one or more processors of the vehicle control module 26 and/or the power control module 28 in various combinations. Accordingly, the system 12 may begin the method 70 by monitoring the first electrical sensor 56*a* of the power inverter 14 to identify a power request from the second power network 22*b* (72). The power output request may further be determined in step 74. If a power output request is not detected in step 74, the method 70 may continue to monitor the electrical sensor 56*a* or inverter 14 for a power output request. If a power output request is detected in step 74, the method 70 may continue to step 76 to identify if the engine of the powertrain 30 is active. If the engine is not active, the method may continue to step 78 and control the ignition of the engine to start. If the engine is active, the method 70 may continue to step 80.

In step 80, the method may continue to control the decoupler 50 to activate the second alternator 18*b* to generate DC power and supply the power to the power inverter 14. In step 84 the system 12 may continue to monitor the second electrical sensor 56*b* to identify the power draw of the accessories 16 on the second power network 22*b*. If the power requested exceeds the power generated by the second alternator 18*b*, the method 70 may continue from step 84 to step 86 and control the second circuit 42*b* to a maximum voltage output setting. As discussed later, the maximum voltage output settings controlled by the power control module 28 and/or the vehicle control module 26 may vary for the first topography 60*a* and the second topography 60*b*. Following step 86, the method 70 may return to step 84. If the power requested in step 84 does not exceed the power generated by the second alternator 18*b*, the method 70 may continue to step 88. In step 88, the system 12 may apply a timeout delay prior to proceeding to step 90, where the method 70 may deactivate the second alternator 18*b* and the engine. If the engine is otherwise active for other operations of the vehicle 10, the method 70 may simply withdraw an activate request in relation to the power output request via the inverter 14.

Returning to step 86, the method may control the system 12 comprising the first topography 60*a* demonstrated in FIG. 3 by optimizing the power output such that the voltage generated by the second alternator 18*b* is adjusted to a high-efficiency operation. The high-efficiency operation may be dependent on the specific characteristics of the second alternator 18*b* and the inverter 14. Such operation may include controlling an engine speed or idle speed of the powertrain 30 via the VCM 26, or controlling the output voltage of the second alternator 18*b*. In this way, the system 12 may optimize operation of the second alternator 18*b* and the inverter 14 to maximize the efficiency of the system 12 configured with the first topography 60*a*.

Still referring to step 86, the method may control the system 12 comprising the second topography 60*b* demonstrated in FIG. 4 by optimizing the power output such that the current through the energy storage device 52 is minimized. In operation, such a state may be achieved by applying a constant voltage through the energy storage device 52 for a predetermined time, such that an approximately zero current or limited current condition is established as provided by equation (1) as follows:

$$V_{ZeroCurrent} = V_{first\_circuit} + V_c \quad (1)$$

where:

$V_{ZeroCurrent}$ is the voltage set point of the second alternator 18*b* controlled via the vehicle control module 26;

$V_{first\_circuit}$ is the voltage measured on the first circuit 42*a* (e.g. the 12V bus shown in FIG. 4); and $V_c$ is the voltage across the energy storage device 52, which corresponds to a constant (e.g. around 16V for the 16V capacitor shown in FIG. 4).

Accordingly, if the power requested exceeds the power generated by the second alternator 18*b* in step 84, the method 70 may continue to set the voltage of the energy storage device 52 or capacitor 54 to $V_{ZeroCurrent}$ such that the current conducted through the energy storage device 52 is minimized.

It is to be understood that variations and modifications can be made on the aforementioned structure without departing from the concepts of the present disclosure, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A power system for a vehicle comprising:

a first power supply network configured to operate at a first voltage and comprising:

a first alternator;

a starter motor; and a battery conductively connected to the first alternator and the starter motor;

a second power supply network configured to operate at a second voltage and comprising:

a second alternator;

a power supply receptacle configured to output power to an external accessory; and a capacitive energy storage device conductively connected to the second alternator and the power supply receptacle; and a directional conduction device interconnecting the first power supply network and the second power supply network.

2. The power system according to claim 1, further comprising an electrical sensor configured to detect a charge of the capacitive energy storage device; and a control module, wherein the control module is configured to:

monitor the charge of the capacitor determining a stored voltage; and selectively activate the second alternator in response to a change in the stored voltage.

3. The power system according to claim 1, wherein the second voltage is greater than the first voltage.

4. The power system according to claim 3, wherein the capacitive energy storage device comprises an ultracapacitor configured to operate at the second voltage.

5. The power system according to claim 3, wherein the directional conduction device is configured to conduct current from the first power supply network to the second power supply network and restrict current from being conducted from the second power supply network to the first power supply network.

6. The power system according to claim 3, wherein the directional conduction device comprises a diode comprising an anode in connection with the first power supply network and a cathode in connection with the second power supply network.

7. The power system according to claim 3, wherein the energy storage device is conductively connected on an anode side to the second power network and on a cathode side to a ground.

8. The power system according to claim 7, wherein the energy storage device comprises a storage potential greater than or equal to the second voltage.

9. The power system according to claim 3, wherein the energy storage device is conductively connected on an anode side to the second power network and on a cathode side to the first power network.

10. The power system according to claim 9, wherein the energy storage device comprises a storage potential less than the second voltage.

11. The power system according to claim 9, wherein the energy storage device comprises a storage potential greater than the first voltage.

12. The power system according to claim 1, wherein the first power supply network is configured to supply power to a vehicle load.

13. The power system according to claim 1, wherein the vehicle load comprises a plurality of electronic devices utilized to control the operation of the vehicle.

14. The power system according to claim 13, wherein the second power supply network is configured to supply power to at least one external accessory configured to operate via the AC power.

15. The power system according to claim 1, wherein the second power supply network further comprises a power inverter configured to convert the second voltage from direct current (DC) power to alternating current (AC) power.

16. A method for supplying power for an external accessory in connection with a vehicle, the method comprising:

generating a first energy at a first voltage in a first electrical circuit via a mechanical motion of an engine of the vehicle;

storing the first energy as chemical energy in a battery;

supplying the first energy to a starter to start the engine of the vehicle;

generating a second energy at a second voltage in a second electrical circuit via the mechanical motion derived of the engine;

storing the second energy in a capacitive storage device;

supplying the second energy to an external accessory conductively connected to the vehicle; and directionally conducting current derived from the first energy from the first electrical circuit to the second electrical circuit.

17. The method according to claim 16, further comprising:

conducting the first energy to a vehicle load comprising an alternator via the first circuit, wherein the vehicle load comprises a plurality of electronic devices utilized to control the operation of the vehicle.

18. The method according to claim 16, further comprising:

converting the second energy from direct current to alternating current and supplying the alternating current to the external electrical accessory.

19. A power system for a vehicle comprising:

a first power supply network configured to operate at a first voltage and comprising:

a first alternator;

a starter motor; and a battery conductively connected to the first alternator and the starter motor;

a second power supply network configured to operate at a second voltage, wherein the second voltage is greater than the first voltage and comprising:

a second alternator;

a power supply receptacle configured to output power to an external accessory; and a capacitive energy storage device conductively connected to the second alternator and the power supply receptacle;

a directional conduction device interconnecting the first power supply network and the second power supply network, wherein the directional conduction device is configured to conduct current from the first power supply network to the second power supply network and restrict current from being conducted from the second power supply network to the first power supply network;

an electrical sensor configured to detect a charge of the capacitive energy storage device, and a control module, wherein the control module is configured to, monitor the charge of the capacitor determining a stored voltage; and selectively activate the second alternator in response to a change in the stored voltage.

* * * * *